United States Patent [19]

Tanaka et al.

[11] Patent Number: 5,790,707
[45] Date of Patent: Aug. 4, 1998

[54] FILM IMAGE READING SYSTEM AND IMAGE PROCESSING METHOD DOT SEQUENTIALLY ADJUSTING IMAGE PARAMETERS

[75] Inventors: Hiroshi Tanaka; Atsuhiko Ishihara; Manabu Hyodo; Makoto Nakazawa, all of Asaka, Japan

[73] Assignee: Fuji Photo Film Co., Ltd., Kanagawa, Japan

[21] Appl. No.: 715,818

[22] Filed: Sep. 19, 1996

Related U.S. Application Data

[62] Division of Ser. No. 416,315, Apr. 4, 1995.

[30] Foreign Application Priority Data

Apr. 11, 1994 [JP] Japan ......................... 6-72079

[51] Int. Cl.⁶ .................................................. H04N 1/60
[52] U.S. Cl. ...................... 382/274; 358/516; 358/549; 358/523; 358/527
[58] Field of Search ........................ 358/527, 516–519, 358/523, 521, 461; 348/96–97, 234–238; 382/167, 274; 395/131, 132, 139; H04N 1/60

[56] References Cited

U.S. PATENT DOCUMENTS

| 4,945,406 | 7/1990 | Cok . | |
|---|---|---|---|
| 5,191,645 | 3/1993 | Carlucci et al. | 395/159 |
| 5,251,024 | 10/1993 | Furukawa et al. | 358/523 |
| 5,253,083 | 10/1993 | Hirota | 358/461 |
| 5,255,093 | 10/1993 | Topper et al. . | |
| 5,337,164 | 8/1994 | Yabe et al. | 358/461 |
| 5,594,558 | 1/1997 | Usami et al. | 358/518 |
| 5,696,840 | 12/1997 | Usami | 382/167 |

FOREIGN PATENT DOCUMENTS

| 63-39267 | 2/1988 | Japan . |
| 4-107074 | 4/1992 | Japan . |
| 4-107082 | 4/1992 | Japan . |
| 4-107083 | 4/1992 | Japan . |
| 4-130397 | 5/1992 | Japan . |

*Primary Examiner*—Kim Yen Vu

[57] ABSTRACT

The present invention achieves an exposure control for getting an image with the best SN without a mechanical iris and an image processing which is good at the color-reappearance and the gradation property with a simple digital processing circuit. When the film image is read by the line sensor 14 which has an electric shutter function, the electric shutter, the film feeding speed and the analog amplifier 16 are controlled totally so as to obtain images with the best SN from high to low transmittance negatives. And, when the dot sequential R, G, B digital signals are processed digitally, the offset values and the gain volumes of the respective R, G, B are calculated based on the maximum value and the minimum value which are detected by the respective R, G, B digital signals, the calculated offset values of the respective R, G, B are added to the dot sequential R, G, B digital signals which are obtained during the re-scanning, and the calculated gain volumes of the respective R, G, B are multiplied by the offset dot-sequential R, G, B digital signals so as to adjust the white balance and the black balance.

12 Claims, 11 Drawing Sheets

FIG. 2(A)

| 7 | 15 | 23 | 31 | 39 | 47 | 55 | 63 |
| 6 | 14 | 22 | 30 | 38 | 46 | 54 | 62 |
| 5 | 13 | 21 | 29 | 37 | 45 | 53 | 61 |
| 4 | 12 | 20 | 28 | 36 | 44 | 52 | 60 |
| 3 | 11 | 19 | 27 | 35 | 43 | 51 | 59 |
| 2 | 10 | 18 | 26 | 34 | 42 | 50 | 58 |
| 1 | 9 | 17 | 25 | 33 | 41 | 49 | 57 |
| 0 | 8 | 16 | 24 | 32 | 40 | 48 | 56 |

FIG. 2(B)

| 6 | 3 | 5 |
| 6 | 1 | 4 |
| 2 | 5 |   |

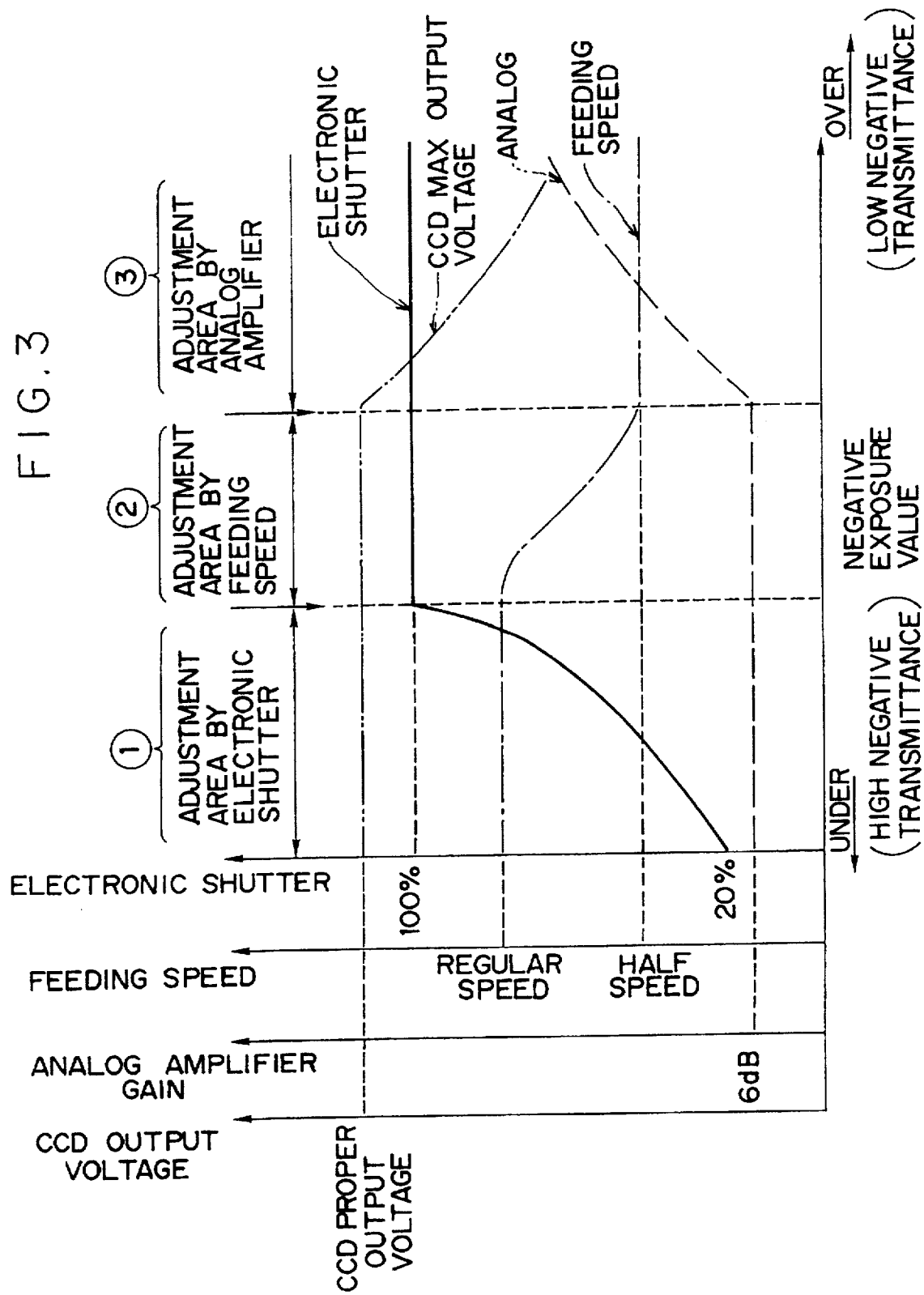

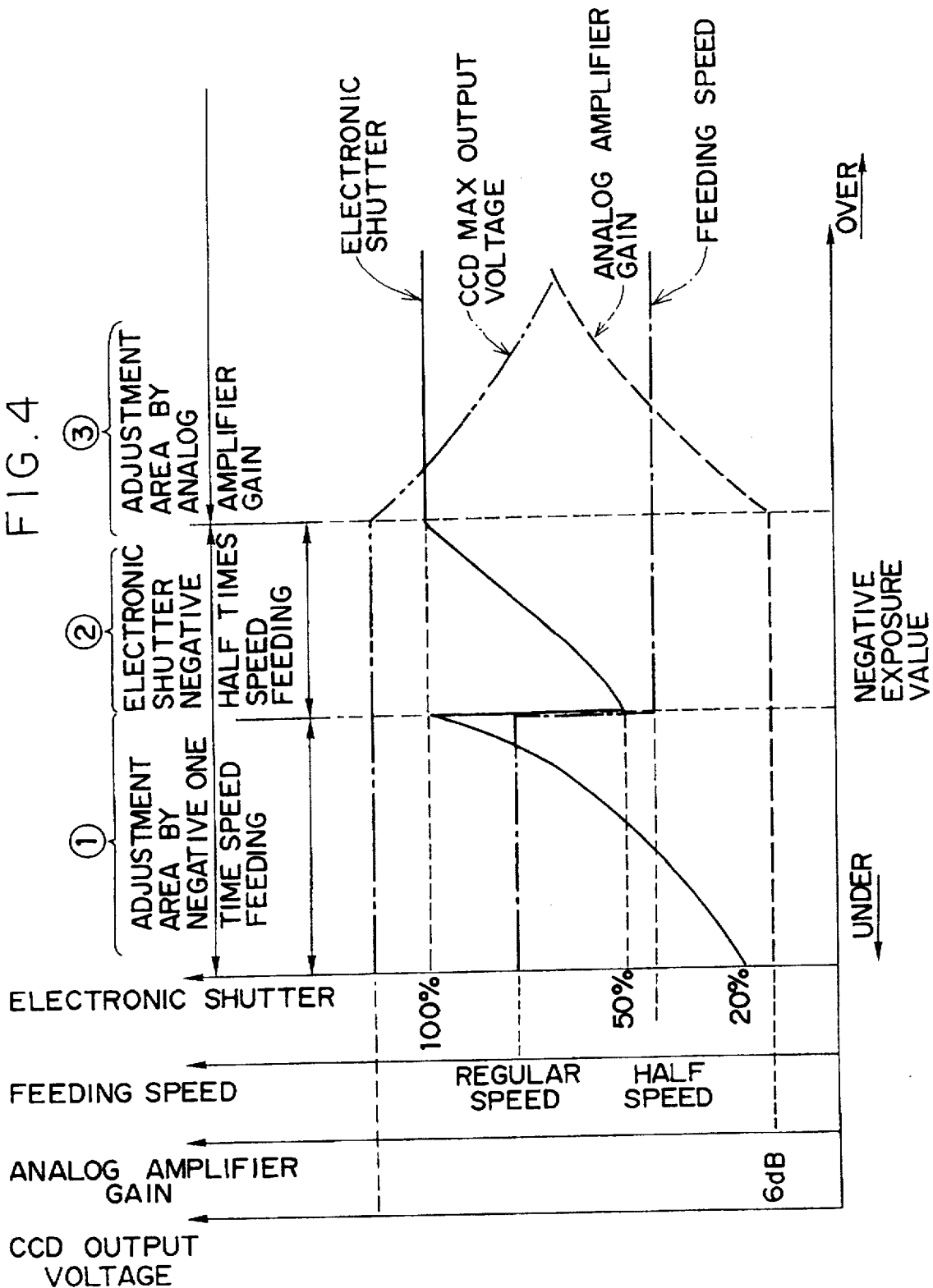

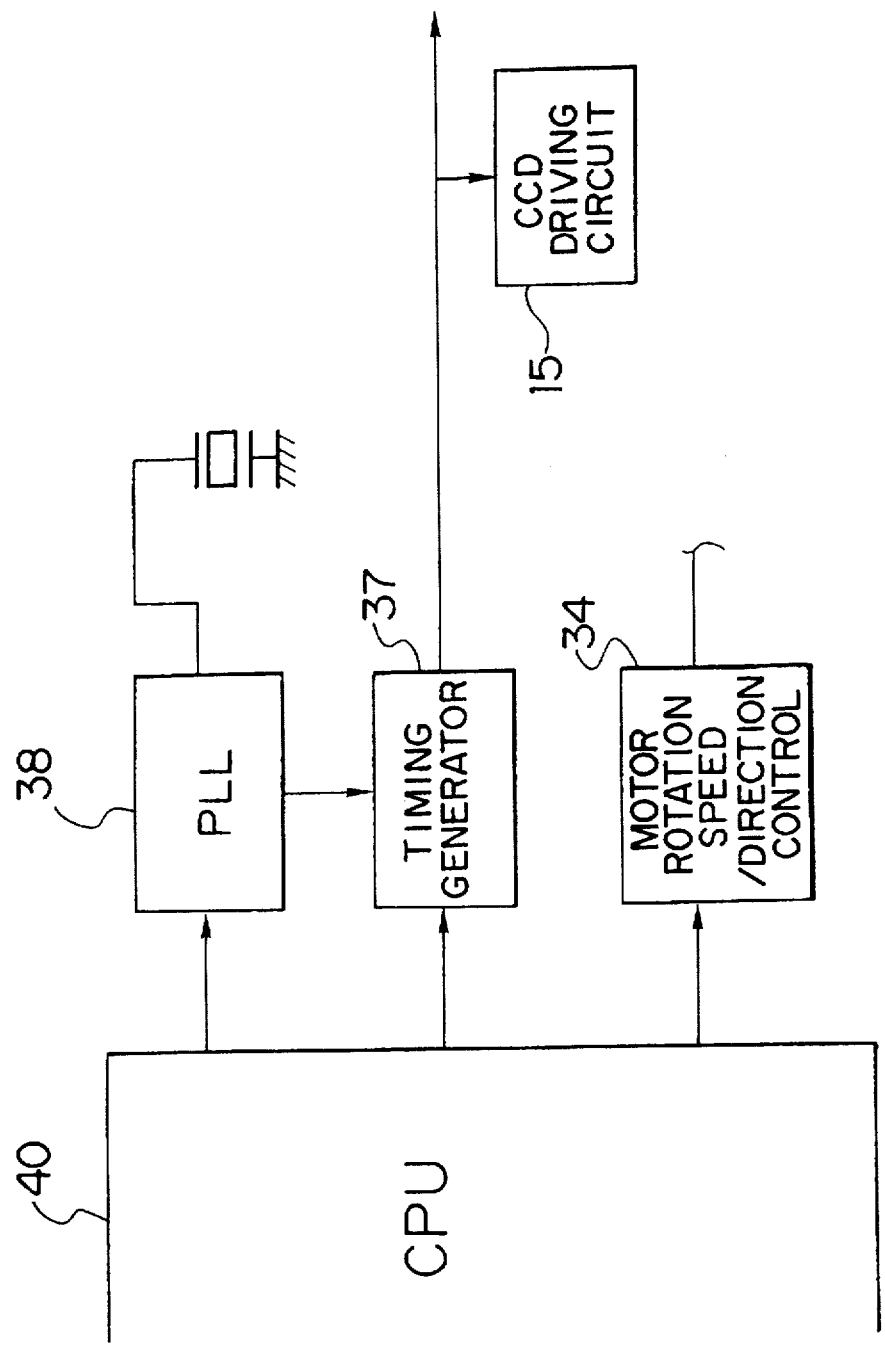

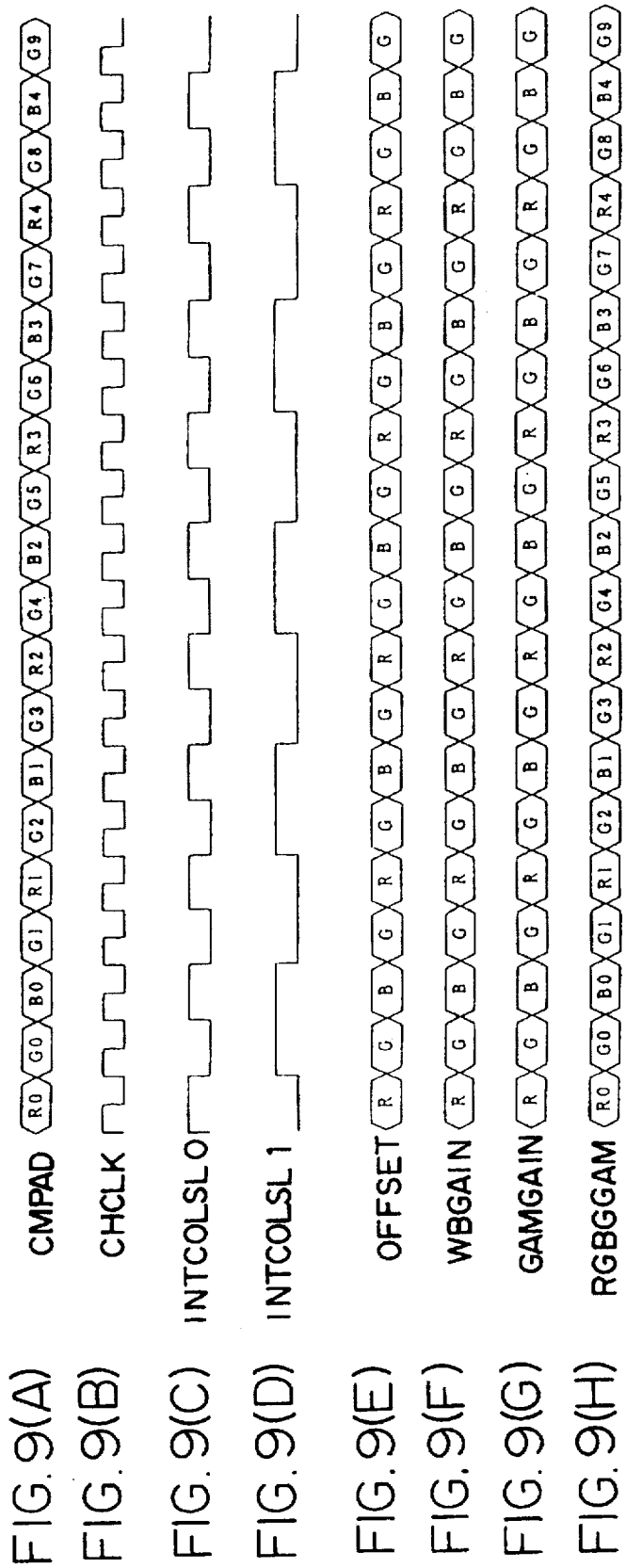

FILM IMAGE READING SYSTEM AND IMAGE PROCESSING METHOD DOT SEQUENTIALLY ADJUSTING IMAGE PARAMETERS

This application is a divisional of copending application Ser. No. 08/416,315, filed on Apr. 4, 1995, the entire contents of which are hereby incorporated by reference.

BACKGROUND OF THE INVENTION

1. Field of the Invention

The present invention relates to a film image reading system and an image processing method.

2. Description of the Related Art

Conventionally, a film scanner is proposed wherein an image of a film is taken in with a CCD line sensor (Japan Patent Application Laid-Open No. 63-39267).

Usually, the exposure of the film scanner of this kind is controlled by a mechanical iris. And, there is no film scanner wherein the exposure is controlled by a electronic shutter of the CCD line sensor.

Further, when a negative image is converted into a positive image, the dispersion of the negative image becomes a problem, therefore, the signal processing circuit in Japan Patent Application Laid-Open No. 4-107082 copes with the problem by the analog processing. That is, the respective maximum and minimum levels of three color signals are detected, and the variable gain amplification circuit and the level adjustment circuit (clamper circuit), which are provided for two signals respectively, are adjusted so as to make the maximum and minimum levels of three color signals equal to each other, whereby the white balance and the black balance are adjusted.

And, in the signal processing circuit of Japan Patent Application Laid-Open No. 4-107082, a gamma correction circuit for making the gradation property of three color signals is provided for every color signal. However, as to the negative image of which the exposure in photographing is under or over, the gradation property differs and the gamma property differs also. Therefore, in the signal processing circuit of Japan Patent Application Laid-Open No. 4-107083, the image signals are processed with the variable gamma so as to compensate the difference of the gamma property by the scene. This signal processing is an analog processing, wherein variable gain amplification circuits are respectively provided in the front and at the back of the gamma correction circuit which has a knee property, and the gains of these variable gain amplification circuits are adjusted so as to change the gamma.

Now, when the exposure of the film scanner is controlled by a mechanical iris, the structure of the iris becomes complex so that it is expensive. Moreover, the exposure control means is independent, so that there is a problem in that it can not cope with the negative between the high and low transmittance rate (that is, the negative from the over exposure to the under exposure).

And, the conventional circuit for adjusting the white balance and the black balance of the R, G, B signals is provided in the R, B signal processing system, and the negative-positive reversal circuit and the gamma correction circuit are provided in the respective R, G, B signal processing systems, therefore, there is a problem in that the processing circuits are large and complex.

Further, the negative of the over exposure is different from the negative of the under exposure in the gradation property to the subject luminance, however, in the gamma correction of Japan Patent Application Laid-Open No. 4-107083, the gamma is not changed in accordance with the subject luminance, so that the coloring of the medium contract becomes a problem.

SUMMARY OF THE INVENTION

The present invention has been developed to eliminate the above-described disadvantages and has as its aim the provision of a film image reading system wherein the exposure can be controlled without a mechanical iris from the high permeation rate negative to the low negative so as to get the image of the best SN ratio.

And, the present invention has been developed to provide an image processing method wherein the image which is excellent in the color reproduction and in the gradation property by the simple digital processing circuit.

To achieve the above-described object, a film image reading system in which a film, which is developed, for still photography is fed at a constant speed, and an image of said film is read by a line sensor, and an output voltage of said line sensor is amplified by an analog amplifier so as to be outputted to an A/D convertor, said film image reading system comprising: said line sensor for discharging an unnecessary electric charge stored in each receiving part when a shutter gate pulse is inputted, and for transferring an electric charge stored in said each receiving part to a shift resistor to be outputted as a sequential voltage signal when a read gate pulse of one line cycle is inputted; first exposure control means for controlling an exposure time by controlling a generating timing of said shutter gate pulse to said read gate pulse; second exposure control means for controlling an exposure time by controlling a feeding speed of said film and changing cycles of said shutter gate pulse and said read gate pulse in proportion to said feeding speed; gain control means for controlling a gain of said analog amplifier; and, control means for controlling said first exposure control means, a second exposure control means and said gain control means based on an information showing a brightness of a film image to be scanned in a manner that an input voltage of said A/D convertor during a scanning of said film image becomes an optimal condition.

And, an image processing method in which a film, which is developed, for still photography is fed at a constant speed, and an image of said film is read by a line sensor, an output voltage of said line sensor is converted into dot-sequential R, G, B digital signals by a A/D convertor, and then the R, G, B digital signals are digital-processed, said image processing method comprising: (a) step of detecting reference maximum values and reference minimum values of said R, G, B digital signals, respectively, while scanning one film image of the film and of calculating offset values and gain volumes of R, G, B respectively base on the reference maximum values and the reference minimum values; (b) step of adding dot-sequential R, G, B digital signals outputted from said A/D convertor during re-scanning of said one film image to said offset values, which are calculated, of R, G, B; and,(c) step of multiplying the dot-sequential R, G, B digital signals which are offset by the gain volumes of R, G, B, respectively; wherein these steps are performed so as to adjust a white balance and a black balance. And, an image processing method further comprises a step of negative-positive reversal by subtracting said dot-sequential R, G, B digital signals, which are offset, from a determined value showing a white peak level between the (a) step and the (b) step. Further, a look-up table which stores previous gamma correction values according to a signal level is arranged and gamma gains for extending or compressing said gamma correction value by multiplying said gamma correction value are set for respective colors, and after said (c) step, (d) step of reading sequentially a gamma correction value from said look-up table based on R, G, B digital signals which are input sequentially and of selecting a gamma gain among gamma gains of said respective colors in accordance with that said gamma correction value which is read corresponds to what color digital signal; and, (e) step of applying a multiplication of said gamma correction value which is read and said gamma gain which is selected and of subtracting a gamma correction value which is extended or compressed by said multiplication from the R, G, B digital signals which are inputted sequentially; are performed so that a gamma correction is achieved dot-sequentially by each color. Moreover, the gamma gain of each color is determined based on a brightness of said film image.

According to this invention, a developed film for a still camera is fed at a constant speed and the image of the film is read by a line sensor, and then, when the output voltage of the line sensor is amplified by an analog amplifier so as to be outputted to an A/D convertor, the following three control means are controlled in a manner that the input voltage of the A/D convertor becomes optimal in its condition. That is, there is a first exposure control means for controlling an exposure time by controlling the generating timing of the shutter gate pulse for the read gate pulse in a line sensor which has an electric shutter function, a second exposure control means for controlling an exposure time by controlling the film feeding speed and changing the cycles of the shutter gate pulse and the like so as to control the electric shutter in accordance with the feeding speed and a gain control means for controlling the gain of the analog amplifier, and the three control means are controlled totally based on the information showing the brightness of the film image to be scanned, whereby the image with the best SN can be obtained from a high transmittance negative to a low transmittance negative.

And, in an image processing method wherein a developed film for a still camera is fed at a constant speed and the image of the film is read by a line sensor, and the output voltage of the line sensor is converted to the dot-sequential R, G, B digital signals by the A/D convertor so as to digital-process the R, G, B digital signals; the reference maximum values and the reference minimum values are detected respectively for the R, G, B digital signals while scanning one film image and the offset values and the gain volumes for R, G, B are calculated previously based on the reference maximum values and the reference minimum values, and then the calculated offset values for R, G, B are added to the dot-sequential R, G, B digital signals which are outputted from the A/D converter during the re-scanning of the one film image. Thereafter, the offset dot-sequential R, G, B digital signals are multiplied by the gain volumes for R, G, B so as to adjust the white balance and the black balance. And, the offset dot-sequential R, G, B digital signals are subtracted from the determined values showing the white peak level so as to achieve the positive-negative reversal. Further, a look-up table, in which the gamma correction values corresponding to the signal levels are stored previously, is provided, and the gamma gain of each color for extending or compressing the gamma correction value is set by multiplying the gamma correction value. And, the gamma correction values are sequentially read from the look-up table based on the R, G, B digital signals which are inputted sequentially and a gamma gain is selected among the gamma gains for the respective colors in accordance with that the read gamma correction value which corresponds to which color digital signal, the read gamma correction value and the selected gamma gain are multiplied and the gamma correction values which are extended or compressed by the multiplication are subtracted from the R, G, B digital signals which are inputted dot-sequentially, whereby the gamma correction is achieved for each color dot-sequentially. And, the gamma gain of each color is determined based on the brightness of the film image, therefore, a good gray balance can be achieved in medium contrast whether it is an under negative or an over negative.

BRIEF DESCRIPTION OF THE DRAWINGS

The exact nature of this invention, as well as other aims and advantages thereof, will be readily apparent from consideration of the following specification relating to the accompanied drawings, in which like reference characters designate the same or similar parts throughout the figures thereof and wherein:

FIG. 2(A) is a view showing each integrating area integrated in the integrating block shown in FIG. 1 and FIG. 2(B) is a view showing each area for calculating a photometric value;

FIG. 3 is a graph showing one embodiment in a case that an electronic shutter, a film feeding speed and an amplifier gain are controlled totally;

FIG. 4 is a graph showing another embodiment in a case that an electronic shutter, a film feeding speed and an amplifier gain are controlled totally;

FIG. 5 is an essential block diagram showing another control method of the timing generator shown in FIG. 1;

FIG. 9(A)-9(H) are timing charts of signals at each part in FIG. 1;

DESCRIPTION OF THE PREFERRED EMBODIMENT

A detailed description will hereafter be given of the preferred embodiment of a film image reading system and an image processing method according to the present invention with reference to the accompanying drawings.

Figure 1:
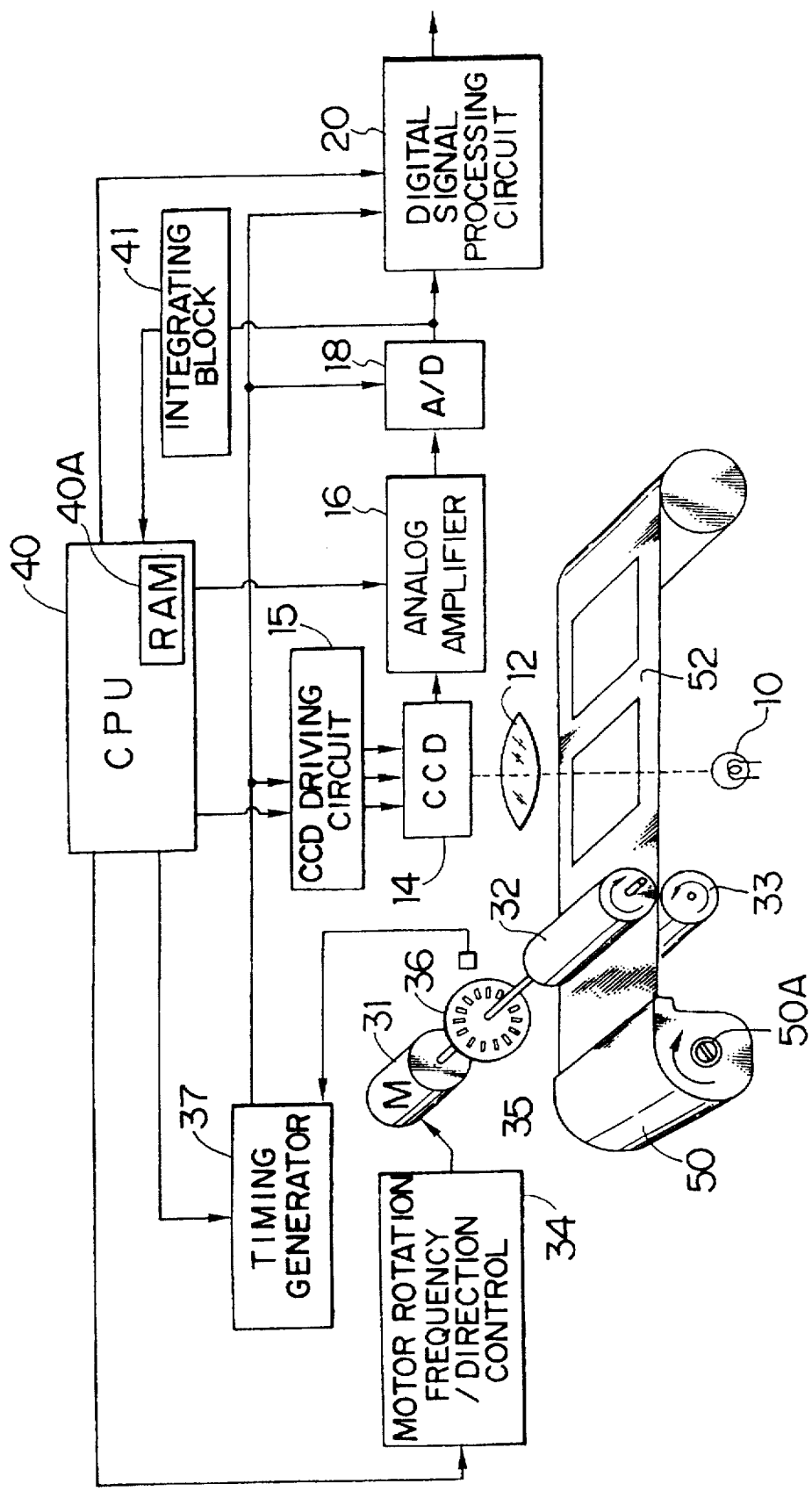
FIG. 1 is an essential block diagram showing one embodiment of the film scanner according to the present invention.

FIG. 1 is an essential block diagram showing one embodiment of the film scanner according to the present invention. This film scanner includes a light source 10 for illuminating, a taking lens 12, a CCD line sensor 14, an analog amplifier 16, an A/D converter 18, a digital signal processing circuit 20, a motor 31, a film driving system including a capstan 32 and a pinch roller 33, a central processing unit (CPU) 40 and the like.

The light source 10 illuminates a developed negative film 52 pulled out from a film cartridge 50 through an infrared cutting filter not shown, and the transmitted light through the film 52 is focused on the receiving surface.

In the CCD line sensor 14, receiving parts for 1024 picture elements are arranged in the direction perpendicular to the film feeding direction, and the image light focused on the receiving surface of the CCD line sensor 14 is stored by charge in each receiving part by providing R, G, B filters so as to be converted to the R, G, B signal charges in accordance with the brightness. When a read gate pulse with one line cycle, which is sent from the CCD driving circuit 15, is added, the stored R, G, B charges are transferred to the shift resistor and outputted as a sequential voltage signal by the resistor transmission pulse. And, in the CCD line sensor 14, a shutter gate and a shutter drain are arranged adjacent to each receiving part, and the shutter gate is driven by the shutter gate pulse whereby the charges stored in the receiving part can be sent out to the shutter drain. That is, the CCD line sensor 14 can control the charges to be stored in the receiving part in accordance with the shutter gate pulse from the CCD driving circuit 15, what is called an electronic shutter function.

The R, G, B voltage signals which reads out from the CCD line sensor 14 are clamped by a CDS clamp, not shown, and sent to the analog amplifier 16 to control the gain which will be described later. The R, G, B voltage signals for one frame, which are output from the analog amplifier 16, are converted to the dot sequential R, G, B digital signals and are applied with the white balance, the black balance, the negative-positive reversal, the gamma correction and the like, thereafter, are stored in an image memory, not shown.

And, the R, G, B digital signals for one frame stored in the image memory are read out repeatedly and are converted to the analog signals by the D/A converter, and then are converted to the NTSC type compound image signals so as to output to the TV monitor. Therefore, the film image can be monitored on the TV monitor.

The film driving system is composed of a film supply part which is engaged with the spool 50A of the film cartridge 50 and drives the spool 50A clockwise/counterclockwise, a film winding part for winding the film 52 fed from the film feeding part, and means placed in the film feeding path for conveying the film 52 by putting the film 52 between the capstan 32 driven by the motor 31 and the pinch roller 33 at a desired speed. And, in the film supply part, the spool 50A of the film cartridge 50 is driven clockwise in FIG. 1 so as to send the film 52 from the film cartridge 50 until the film end is wound by the film winding part.

The CPU 40 controls the normal rotation/reversal rotation and the start/stop of the motor 31 and the film feeding speed by the pulse width modulation via the motor rotation frequency/ direction control circuit 34. For example, when the feeding speed is set at 9.25 mm/sec. while taking in a standard film image, the speed can be controlled from the low speed of the half standard speed (4.625 mm/sec.) to the high speed of 16 times speed (148.0 mm/sec.). And, the number of the image elements in the same direction as the film feeding direction for one frame changes in accordance with the film feeding speed when the cycle of the read gate pulse and the like in the CCD driving circuit 15 is not changed, for example, the number of the image elements at the half, one, eight and 16 times speed are 1792, 896, 112 and 56 image elements, respectively.

Next, an explanation will be given of the exposure control method of the film scanner according to the present invention.

First, the film cartridge 50 is set in a cartridge storage part (not shown), and when the film 52 is sent out from the film cartridge 50 and the film end is wound around the winding axis of the film winding part (the film loading is completed), the film 52 is pre-scanned. That is, the film 52 is fed at a high speed of 16 times in the sequential direction (in the right direction of FIG. 4), and rewound in the reversal direction at the high speed of 16 times. While pre-scanning, the dot-sequential R, G, B digital signals are taken in the integrating block 41 through the CCD line sensor 14, the analog amplifier 16 and the A/D converter 18.

The film feeding speed is 16 times, so that the number of the image elements in the film feeding direction for one frame is 56. The CCD line sensor 14 has receiving parts for 1024 image elements in the direction perpendicular to the film feeding direction, as described above, and the receiving parts are thinned down one thirty-second whereby the number of the image elements in the direction perpendicular to the film feeding direction for one frame is 32. FIG. 2(A) shows integrating areas in the integrating block 41 of the film image for one frame. That is, one frame (56×32 image elements) is divided into 8×8 integrating areas, and the integrating block 41 integrates the digital signal every integrating area and outputs the integrated value to the CPU 40. And, one integrating area includes 7×4 image elements.

The CPU 40 calculates the six average luminance values for the respective areas in accordance with the integrated value from the integrating block 41 as shown in FIG. 2(B). The average luminance value of the central area 1 and the luminance value of the peripheral area, which is close to the average luminance area, are added and averaged, whereby the photometric value for the exposure control is calculated. The average luminance value of the central area 1 is weighted more than the luminance value of the peripheral areas.

The CPU 40 calculates the photometric values showing the brightness of the respective frames as described above, and these photometric values are stored in the random access memory (RAM) 40A built in the CPU. The photometric values for the respective frames are used for the exposure control during the main-scanning of each frame.

Now, the exposure control according to the present invention is achieved in accordance with the following three means.

The CCD line sensor 14 has the electronic shutter function as described above, the shutter value is controlled through the CCD driving circuit 15 from the CPU 40, so that the exposure time is controlled. And, in this embodiment, the variable range of the shutter value of the electric shutter is 20%–100%.

Further, during the main-scanning, the CPU 40 can control so as to feed the film 52 at a desired speed from one to half speed via the motor rotation frequency/direction control circuit 34 and the motor 31. A disc 35 with slits is fitted to the axis of the motor 31, and a photo detector 36 for detecting the silts of the disc 35 outputs the pulse signal showing the rotation speed of the motor to the timing generator 37. During the main-scanning, the timing generator 37 generates a pulse signal, which is synchronous with the rotation of the motor 31, by the input pulse signal. The pulse signal which is generated from the timing generator 37 is added to the CCD driving circuit 15, the A/D converter 18, a digital signal processing circuit 20 and the like, whereby the respective circuits are controlled as to the driving speed and are synchronized.

That is, by changing the film feeding speed, the cycles of the read gate pulse, the shutter gate pulse and the resistor transmission pulse, which are output from the CCD driving circuit 15 to the CCD line sensor 14, are changed automatically. Further, during the main-scanning at a regular speed, the number of the image elements in the same direction as the film feeding direction of one frame becomes 896, and when the film feeding speed is changed, the cycles of the read gate pulse and the like of the CCD driving circuit 15 are changed automatically, so that the number of the image elements does not change.

The film feeding speed is changed from regular to half, whereby the exposure time can be changed between 100% and 200%. Further, the control method of the timing generator 34 is not limited to the above embodiment, as shown in FIG. 5, the reference clock frequency of the timing generator 37 may be changed in accordance with the motor rotation speed by the phase synchronous loop (PLL) 38.

Further, in the analog amplifier 16, which is arranged at the next part of the CCD line sensor 14, the gain is controlled by the gain control signal from the CPU 40, and in this embodiment, the amplifier gain can vary between 6 dB and 18 dB (2–8 times). The lowest gain of the analog amplifier 16 can be determined in accordance with the following formula;

A/D converter rated input voltage lowest gain=min(CCD rated output voltage, analog amplifier rated input voltage).

Further, hereinunder, min(CCD rated output voltage, analog amplifier rated input voltage) is called a CCD proper output voltage. When the CCD output is equal to the CCD proper output voltage and the amplifier gain is set at the lowest gain, the input voltage to the A/D converter 18 becomes proper (rated input voltage), so that the SN becomes best.

Next, an explanation will be given of a case that the electronic shutter, the film feeding speed and the amplifier gain of the CCD line sensor are controlled totally based on the photometric value of the frame will be main-scanned.

FIG. 3 is a graph showing one embodiment of the case in that the electronic shutter, the film feeding speed and the amplifier gain are controlled totally and shows the change of the set value of each parameter to the negative exposure value (photometric value) and the relation of the MAX output voltage of the CCD line sensor. As shown in FIG. 3, the under negative has a high transmittance, therefore, the negative feeding speed is set at a regular speed and the gain of the analog amplifier is set at the lowest gain (6 dB), whereby the CCD output voltage is adjusted to the CCD proper output voltage only by the control with the electronic shutter. And, the open rate of the electric shutter is increased as the negative becomes over (the negative transmittance lowers) so as to correspond to the lowering of the transmittance.

When the open rate of the electronic shutter becomes 100%, thereafter, the receiving value (the exposure time) of the CCD line sensor 14 is adjusted by the negative feeding speed. That is, the open rate of the electronic shutter is fixed at 100% to set the amplifier gain at the lowest gain and the feeding speed lowers as the negative becomes over.

When the adjustment range by the feeding speed gets to the limitation (half speed) and the negative becomes over, the open rate of the electronic shutter is set at 100% and the feeding speed is fixed at the lowest speed (half speed), and only the analog gain is adjusted so that the input voltage of the A/D convertor 18 becomes proper (rated input voltage). And, in FIG. 3, the area is divided into ①,②,③, and the area ① shows the adjustment area only by the electronic shutter, the area ② shows the adjustment area only by the feeding speed and the area ③ shows the adjustment area only by the analog amplifier gain. As shown in FIG. 3, in the areas ①,②, the MAX output voltage of the CCD line sensor is the CCD proper output voltage (constant), the best SN can be obtained. In the area ③, the amplifier gain of the analog amplifier is compensated for the MAX output voltage of the CCD line sensor which does not reach the CCD proper output voltage, therefore, the SN lowers as the negative becomes over. However, the maximum rated input range of the A/D converter is used, so that the resolution in the A/D conversion does not become lower.

FIG. 4 shows a graph of another embodiment of a case in that the electronic shutter, the film feeding speed and the amplifier gain are controlled totally. In this embodiment, the negative feeding speed is varied not continuously but in two steps including a regular speed and a half speed. Further, the adjustments in the areas ①,③ are the same as that of the embodiment in FIG. 3, therefore, an explanation will be given of the adjustment in the area ②.

When the open rate of the electronic shutter becomes 100% and the control moves to that in the area ②, the negative feeding speed is lowered to a half speed immediately and the open rate of the electric shutter, which has reached 100% once, is returned to 50%. And, in the state that the negative feeding speed is fixed at a half speed, the CCD output voltage is adjusted so as to become the CCD proper output voltage by the control of the electronic shutter. And, when the negative becomes over and the open rate of the electronic shutter becomes 100% again, thereafter, the adjustment by the analog amplifier gain in the area ③ is performed.

And, the negative feeding speed is switched in two steps, so that the timing generator 37 can be simple. That is, the reference clock frequency is used or divided into ½ without synchronizing with the rotation of the motor 31 and/or using PLL, whereby the timing signal can be generated in accordance with the switching of the negative feeding speed. However, when the image is read in the area ②, there is a problem in that the scanning speed decreases compared with the case in FIG. 3.

Next, an explanation will be given of the digital signal processing circuit 20 for the white balance, the black balance, the negative-positive reversal, the gamma correction and the like.

First, the explanation will be given of the calculating method of the offset value and the gain value for adjusting the white balance and the black balance.

The CPU 40 inputs histogram values, which are obtained through the integrating block 41 during the pre-scanning, and detects the respective reference maximum values and the respective minimum values for R, G, B among these histogram values. And, an offset value and a gain volume can be calculated based on the reference maximum value and the reference minimum value in accordance with the following formulas;

$$\text{offset value} = 1023 - R_{max} \quad (1)$$

$$\text{gain volume} = 1023 / (R_{max} - R_{min}) \quad (2)$$

Further, the formulas (1) and (2) relate to R, however, another color channel is calculated similarly. Here, the R, G, B digital signals are shown with 10 bits, and 1023 is the maximum value thereof.

Figure 6A:
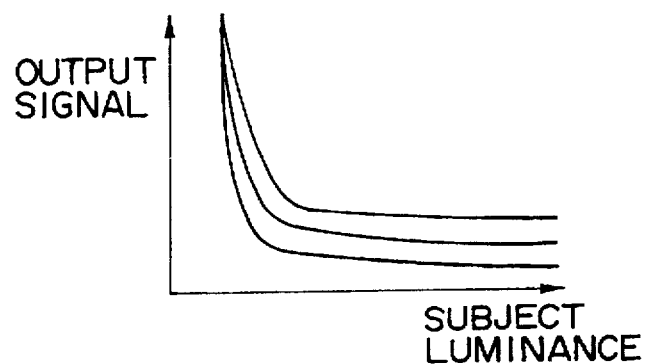
FIGS. 6(A)-6(D) are graphs showing the processing contents at each part of the digital signal processing circuit in FIG. 1.

And, the original $R_{org}$, which is outputted from the A/D convertor 18 during the main-scanning, is added with the offset value of R as the following formula;

$$R1 = R_{org} + \text{offset value} \quad (3)$$

whereby a digital signal R1 which is black-point-offset is obtained. The originals for G, B are treated similarly, whereby the peak values (black of positive image) of the R, G, B digital signals are corresponded (see FIG. 6(A)).

Figure 6B:
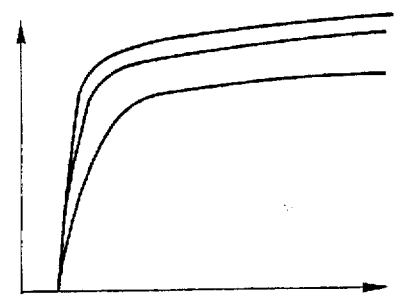

Then, the offset digital signal R1 is calculated as the following formula;

$$R2 = 1023 - R1 \quad (4)$$

whereby the negative-positive reversal is performed (see FIG. 6(B)).

Figure 6C:
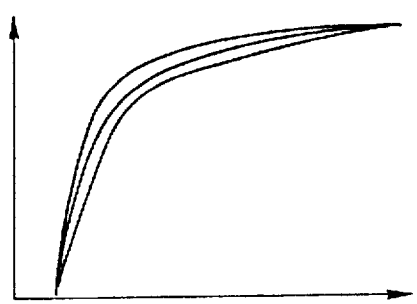

Next, the digital signal R2 which is applied with the negative-positive reversal is multiplied by the gain volume calculated with the formula (2) as the following formula;

$$R3 = R2 \times \text{gain volume} \quad (5)$$

whereby the other peak values (white of positive image) of the R, G, B digital signals are corresponded (see FIG. 6(C)).

Figure 6D:
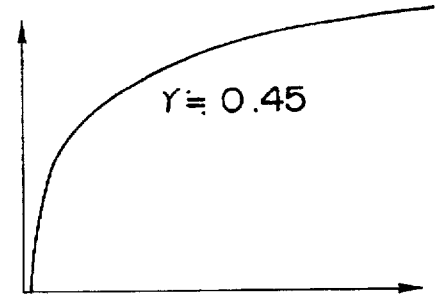

Lastly, the R, G, B digital signals, which are multiplied by the gain volumes, are applied with the respective gamma corrections, whereby the gray is adjusted (see FIG. 6(D)).

Next, a detailed explanation will be given of the gamma correction.

First, a look-up table (hereinunder, called a base LUT) is prepared for the reference of the gamma correction.

Figure 7A:
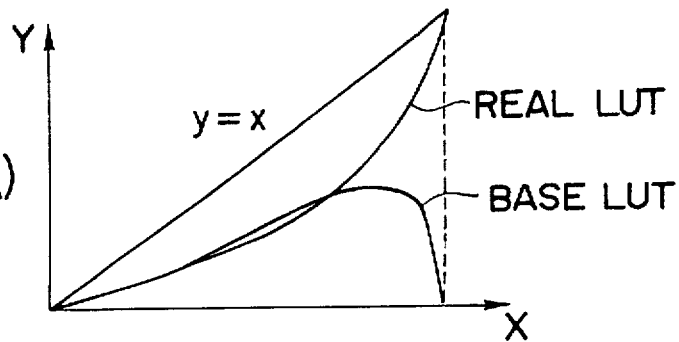
FIGS. 7(A)-7(C) are graphs for explaining the gamma correction method according to the present invention.
Figure 7B:
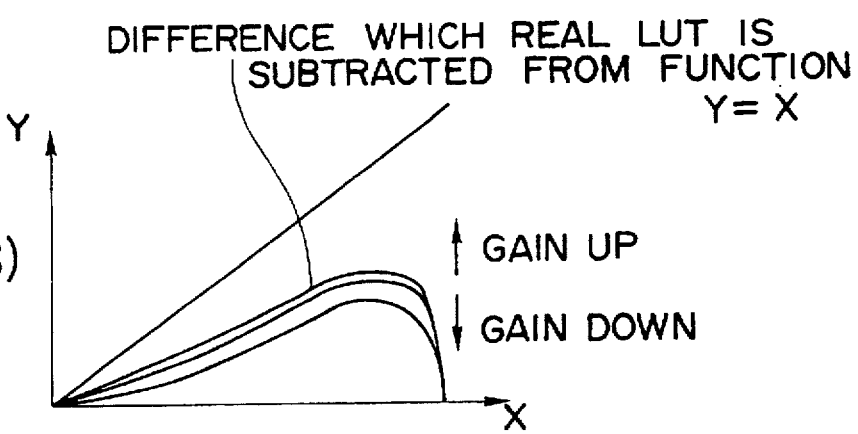
Figure 7C:
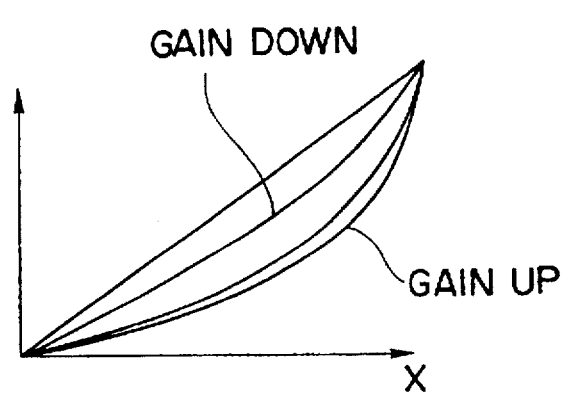

The base LUT has a difference value (gamma correction value) which the real look-up table (hereinunder, called a real LUT) showing a suitable gamma property is subtracted from the function y=x as shown in FIG. 7(A). The base LUT is multiplied by the gamma gain, whereby the base LUT can be changed (see FIG. 7(B)). A suitable gamma gain is multiplied from one base LUT, whereby the LUT, of which the gamma correction values are extended or compressed by the respective R, G, B, can be obtained. And, the LUT, of which the gamma correction value is extended or compressed by the respective R, G, B, is subtracted from the function y=x, whereby the real LUT for the respective R, G, B can be obtained (see FIG. 7(C)).

Therefore, the white balance and the black balance are adjusted in accordance with the above formulas (3)–(5), and when the dot sequential R, G, B digital signals, which are reversed positively-negatively, are applied with the gamma correction, the sequential gamma correction value is read from the base LUT based on the dot sequential R, G, B digital signals, the gamma correction value is multiplied by the gamma gain of each R, G, B so as to obtain the suitable extended or compressed gamma correction value and the extended or compressed gamma correction value of each color is subtracted from the dot sequential R, G, B digital signal, so that the gamma correction can be performed dot-sequentially by each color.

Figure 8:
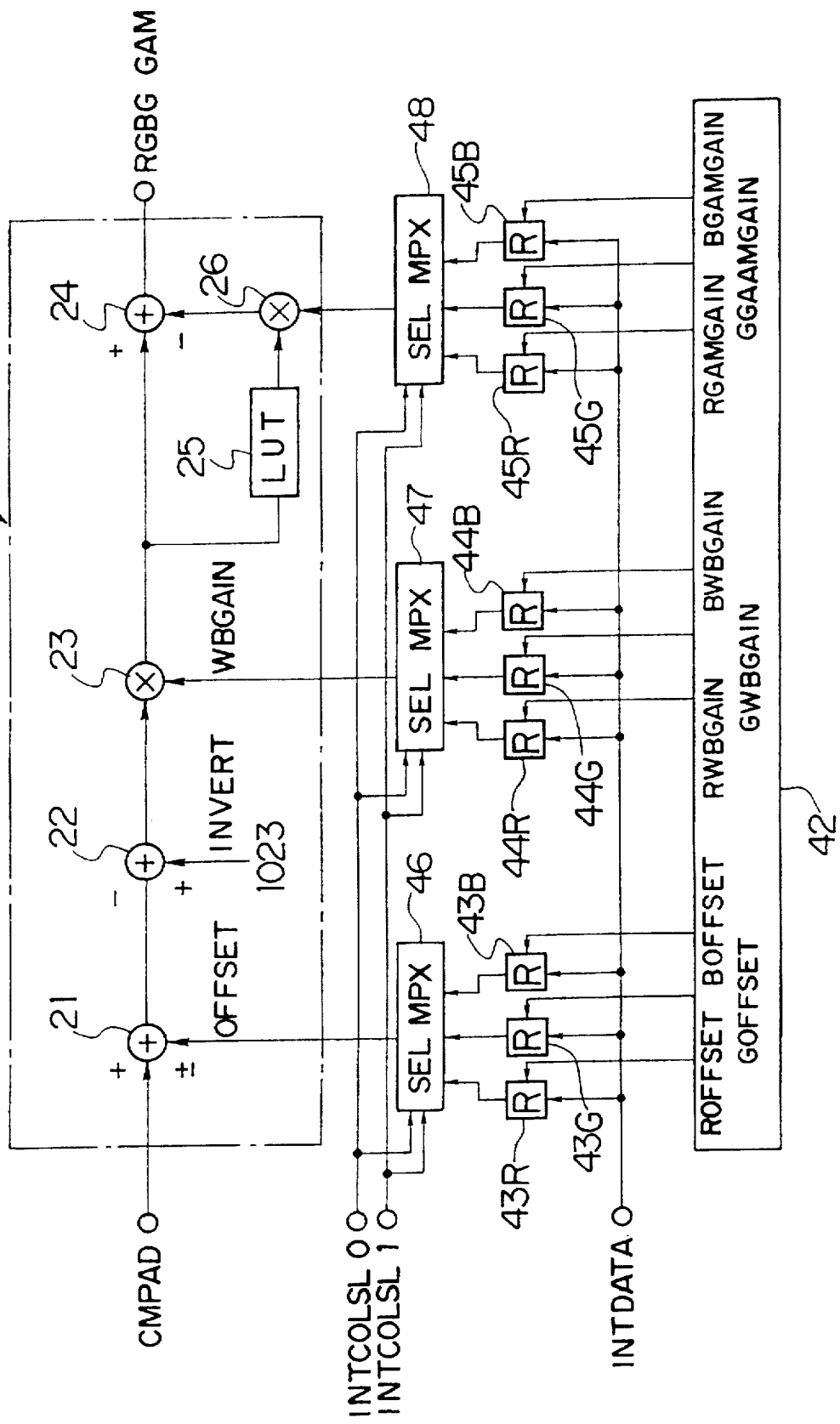
FIG. 8 is a block diagram showing the detailed structure of the digital signal processing circuit in FIG. 1.

FIG. 8 is a block diagram including the internal structure of the digital signal processing circuit 20 shown in FIG. 1. The digital signal processing circuit 20 processes digital signals as described above and includes adders 21, 22, 24, multipliers 23, 26 and a base LUT 25. The dot sequential R, G, B digital signal CMPAD is input to the adder 21 from the A/D converter 18. And, as shown in FIG. 9(A) the digital signal CMPAD follows in time series R, G, B, G in accordance with the clock CHCLK (FIG. 9(B)).

On the other hand, the CPU 40 calculates the offset values ($R_{offset}$, $G_{offset}$, $B_{offset}$) and the gain volumes ($R_{wbgain}$, $G_{wbgain}$, $B_{wbgain}$) for each R, G, B so as to store them, and stores the gamma gains ($R_{gamgain}$, $G_{gamgain}$, $B_{gamgain}$) for each R, G, B. And, the offset value and the like are stored for every frame. And, the offset value and the like corresponding to a frame to be main-scanned are selected by an address decoder 42, the R, G, B offset values are stored in resistors 43R, 43G, 43B by the INTDATA in FIG. 8, the R, G, B gain volumes are stored in resistors 44R, 44G, 44B and the R, G, B gamma gains are stored in resistors 45R, 45G, 45B. And, these are kept in the resistors until the R,G, B digital signals for one frame are processed.

The offset values ($R_{offset}$, $G_{offset}$, $B_{offset}$) stored in the resistor 43R, 43G, 43B are added to a multiplexer 46, and timing signals INTCOLSL 0, 1 (FIGS. 9(C), 9(D)) which are made by dividing the clock CHCLK (FIG. 9(B)) are added to another input of the multipulexer 46. The multiplexer 46 selects one offset value among three offset values by the timing signal INTCOLSL 0, 1, and the selected offset value (FIG. 9(E)) is outputted to another output of the adder 21 in the digital signal processing circuit 20.

Similarly, a multiplexer 47 selects one gain volume among three gain volumes ($R_{wbgain}$, $G_{wbgain}$, $B_{wbgain}$) input from the resistors 44R, 44G, 44B and outputs the selected gain volume (FIG. 9(F)) to the multiplier 23, and a multiplexer 48 selects one gamma gain among three gamma gains ($R_{gamgain}$, $G_{gamgain}$, $B_{gamgain}$) input from the resistors 45R, 45G, 45B and outputs the selected gamma gain (FIG. 9(G)) to the multiplier 26.

On the other hand, the digital signal CMPAD (FIG. 9(A)) is inputted to the adder 21 as described above and the adder 21 adds the digital signal CMPAD with the offset value. With this arrangement, the digital signal, which is black point offset, can be obtained (see formula (4), FIG. 6(A)).

The digital signal, which is output from the adder 21 and black point offset, is added to the negative input of the adder 22 the value (1023) showing a white peak level is added to the positive input of the adder 22, and the adder 22 subtracts the black point offset digital signal from 1023. The negative-positive reversed digital signal can be obtained (see formula (5), FIG. 6(B)).

Then, the negative-positive reversed digital signal is provided to the multiplexer 23. The gain volume is provided to another input of the multiplier 23 from the multiplexer 47, and the multiplier 23 multiplies two inputs so as to adjust the white of the positive image of the R, G, B digital signals (see formula (6), FIG. 6(C)).

Next, the digital signal, which is outputted from the multiplier 23, is provided to the adder 24 and the base LUT 25. The base LUT 25 has the gamma correction value according to the input level as shown in FIG. 7(A), reads out the gamma correction value in accordance with the input digital signal and outputs the gamma correction value to the multiplier 26. The gamma gain is supplied to another input of the multiplier 26 from the multiplexer 48, and the multiplier 23 multiplies two inputs, whereby the gamma correction values of the R, G, B digital signals for the respective colors are generated and outputted to the negative input of the adder 24. Further, the base LUT 25 has a compressed gamma correction value and the gamma correction value is extended suitably with the gamma gain of each color.

The adder 24 subtracts the gamma correction value which is extended suitably by each color from the R, G, B digital signal. In this way, the regular R, G, B digital signal $RGBG_{gam}$ (FIG. 9(H)) can be obtained.

Figure 10A:
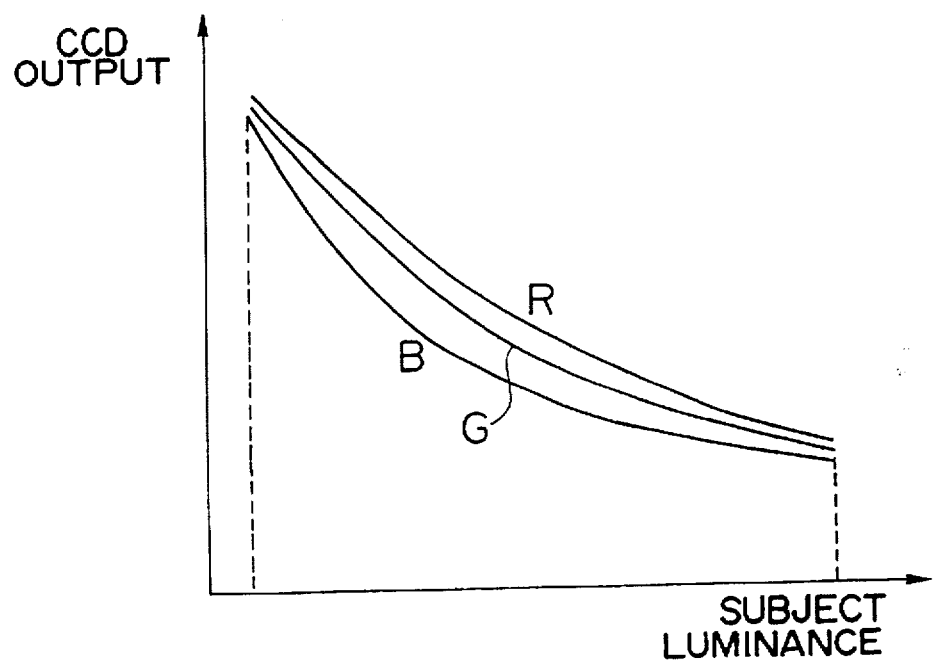
FIGS. 10(A) and 10(B) are graphs showing the relation between the subject brightness and the CCD output; and, FIGS. 11(A)-11(C) are graphs showing the gradation property, the gamma property and the base LUT to the subject brightness of the different exposure negatives.
Figure 10B:
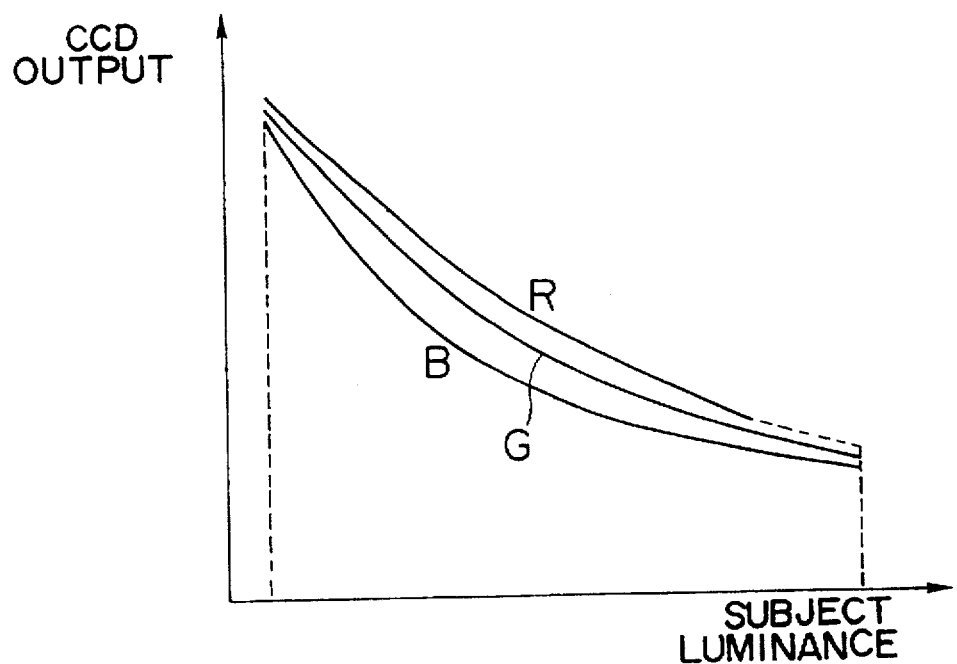

FIG. 10 is a graph showing the relation between the subject luminance and the CCD output. In an usual screen, as shown in FIG. 10(A), there is colorless gray, that is, white and black in the maximum area and the minimum area of the subject luminance. However, practically, all scenes do not meet this, for example, there is no R component of the subject in the maximum area of the subject luminance, so that there is a case in that only the CCD output of R becomes larger than that of G, B.

In this embodiment, the CPU 40 detects the reference maximum values and the reference minimum values of the respective R, G, B from the values, which are calculated from the histogram values, and calculates the offset value and the gain volume with the detected values, however, the present invention should be not limited to this, the differences between the reference maximum values and the reference minimum values, that is, $R_{max}-R_{min}$, $G_{max}-G_{min}$, $G_{max}-G_{min}$ are calculated, and the maximum values and the minimum values are reset in a manner that these values becomes close to each other and the offset values and the gain values may calculated in accordance with the formulas (1), (2). With this method, the screen shown in FIG. 10 (B) can be color-reappeared well..

Figure 11A:
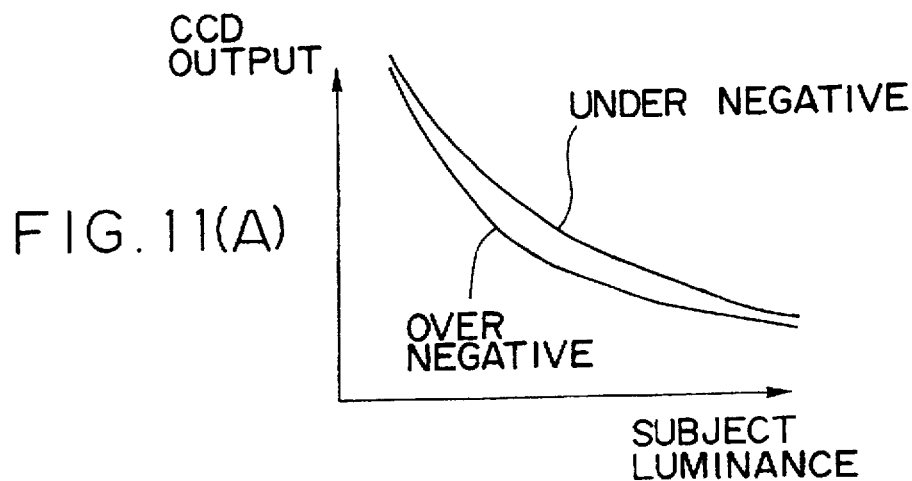
Figure 11B:
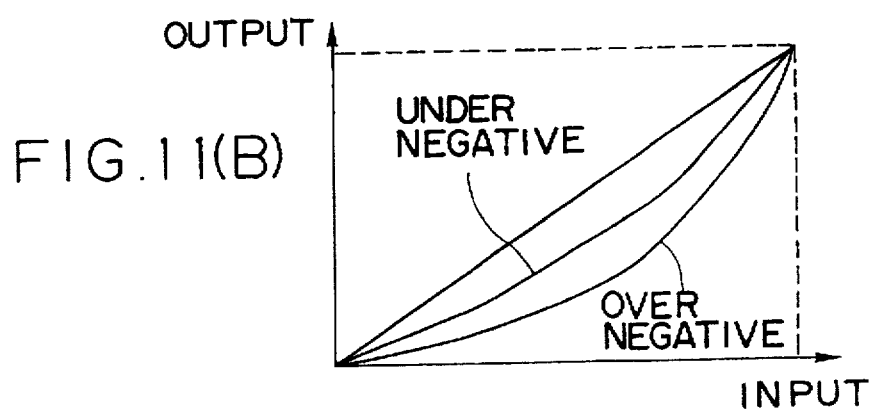
Figure 11C:
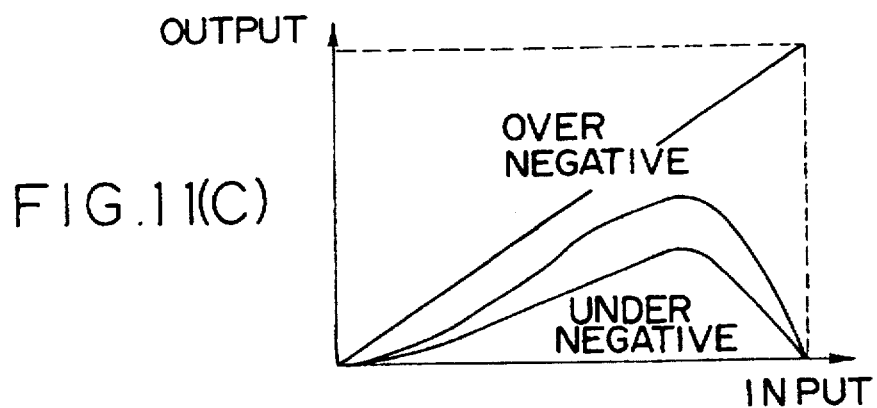

And, the different exposure negative differs in the gradation property to the subject luminance as shown in FIG. 11(A), and the gamma property differs as shown in FIG. 11(B). Therefore, the base LUT must be changed in accordance with the exposure value of the negative as shown in FIG. 11 (C).

Then, the the photometric value, which is detected for the exposure control, is used so as to change the gamma gain ($R_{gamgain}$, $G_{gamgain}$, $B_{gamgain}$) of each color, whereby the gamma correction can be applied in accordance with the exposure value of the negative.

As described above, according to the film image reading system of the present invention, the electric shutter of the line sensor, the film feeding speed and the amplifier gain are controlled totally so as to control the exposure, therefore, image signals with best SN can be obtained from a high transmittance negative to a low transmittance negative without a mechanical iris. And, according to the image processing method of the present invention, the digital processing is performed in time series and dot sequentially, so that the structure of the digital signal processing circuit for a white balance, a black balance a negative-positive reversal, a gamma correction and the like can be simple, therefore, the cost can be reduced, and the base LUT is multiplied by the gamma gain so as to generate the various gamma correction values, so that there are advantages in that only one base LUT is needed and the memory volume can be reduced. Further, the gamma correction is performed in accordance with the negative exposure volume, so that a good color-reappearance can be achieved without coloring of medium contrast.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. A gamma corrector for correcting R, G, B digital signals of a film image which are input sequentially comprising:

a reading system reading the film image and outputting R, G, B, digital signals;

a look-up table in which a base gamma correction value according to a signal level is stored previously;

a gamma gain setter setting gamma gain of each color for extending or compressing said base gamma correction value;

a reader reading said base gamma correction value sequentially from said look-up table based on said R, G, B digital signals which are input sequentially;

a selector selecting a gamma gain among gamma gains of respective colors in accordance with a color digital signal corresponding to said base gamma correction value output by said reader;

a multiplier multiplying said base gamma correction value output from said reader and said gamma gain output by said selector to output a real gamma correction value; and a subtractor subtracting said real gamma correction value output by said multiplier from said R, G, B digital signals which are input sequentially, thereby providing gamma correction dot-sequentially for each color.

2. The gamma corrector according to claim 1, wherein said gamma gain setter includes means for varying the gamma gain of each color in accordance with a brightness of the film image.

3. An image processing method in which a film, which is developed, for still photography is fed at a constant speed, an image of said film is read by a line sensor, an output voltage of said line sensor is converted into dot-sequential R, G, B digital signals by a A/D convertor, and then said R, G, B digital signals are digital-processed, said image processing method comprising;

(a) step of detecting reference maximum values and reference minimum values of said R, G, B digital signals, respectively, while scanning one film image of said film and of calculating offset values and gain volumes of R, G, B respectively base on said reference maximum values and said reference minimum values;

(b) step of adding dot-sequential R, G, B digital signals outputted from said A/D convertor during re-scanning of said one film image to said offset values, which are calculated, of R, G, B; and, (c) step of multiplying said dot-sequential R, G, B digital signals which are offset by said gain volumes of R, G, B, respectively;

wherein these steps are performed so as to adjust a white balance and a black balance.

4. An image processing method as set forth in claim 3, further comprising a step of negative-positive reversal by subtracting said dot-sequential R, G, B digital signals, which are offset, from a determined value showing a white peak level between said (a) step and said (b) step.

5. An image processing method as set forth in claim 3, wherein said reference maximum values and said reference minimum values in said (a) step are calculated among m×n integrated values obtained from a integrating block for integrating each picture element group which one image plane is divided into m×n.

6. An image processing method as set forth in claim 3, wherein a look-up table which previously stores a gamma correction value according to a signal level is arranged and gamma gains for extending or compressing said gamma correction value by multiplying said gamma correction value are set for respective colors, and after said (c) step, (d) step of reading sequentially a gamma correction value from said look-up table based on R, G, B digital signals which are inputted sequentially and of selecting a gamma gain among gamma gains of said respective colors in accordance with that said gamma correction value which is read corresponds to what color digital signal; and, (e) step of applying a multiplication of said gamma correction value which is read and said gamma gain which is selected and of subtracting a gamma correction value which is extended or compressed by said multiplication from said R, G, B digital signals which are inputted sequentially;

are performed so that a gamma correction is achieved dot-sequentially by each color.

7. An image processing method as set forth in claim 6, wherein said gamma gain of each color is determined based on a brightness of said film image.

8. A method for gamma correcting R, G, B digital signals of a film image which are input sequentially comprising:

reading the film image and outputting sequential R, G, B, digital signals therefrom;

providing a look-up table in which a base gamma correction value according to a signal level is stored previously;

setting gamma gain of each color for extending or compressing said base gamma correction value;

reading said base gamma correction value sequentially from said look-up table based on said sequential R, G, B digital signals;

selecting a gamma gain among gamma gains of respective colors in accordance with a color digital signal corresponding to said gamma correction value which is read;

multiplying said base gamma correction value which is read and said gamma gain which is selected to form a real gamma correction value; and subtracting said real gamma correction value formed by said multiplying from said sequential R, G, B digital signals so that a gamma correction is achieved dot-sequentially by each color.

9. An image processing method as set forth in claim 8, wherein said setting includes varying said gamma gain of each color based on a brightness of said film image.

10. An image processor for developed film for still photography comprising:

means for feeding developed film;

a line sensor reading an image of said film;

an A/D convertor converting an output voltage from said line sensor into dot-sequential R, G, B digital signals;

a detector detecting reference maximum values and reference minimum values of said R, G, B digital signals, respectively, while scanning one film image of said film;

a calculator calculating offset values and gain volumes of R, G, B respectively based on said reference maximum values and said reference minimum values;

an adder adding dot-sequential R, G, B digital signals output from said A/D convertor during re-scanning of said one film image to said offset values, which are calculated, of R, B, G; and a multiplier multiplying said dot-sequential R, G, B digital signals output from said adder by said gain volumes of R, G, B, respectively, wherein said detector, said calculator, said adder and said multiplier adjust a white balance and a black balance.

11. The image processor as set forth in claim 10, wherein said adder further includes a subtractor subtracting said dot-sequential R, G, B, digital signals which have been added to said offset values from a determined valued indicating a white peak level.

12. The image processor as set forth in claim 10, further comprising:

a look-up table in which a base gamma correction value according to a signal level is stored previously;

a gamma gain setter setting gamma gain of each color for extending or compressing said base gamma correction value;

a reader reading said base gamma correction value sequentially from said look-up table based on said R, G, B digital signals which are input sequentially;

a selector selecting a gamma gain among gamma gains of respective colors in accordance with a color digital signal corresponding to said base gamma correction value output by said reader;

a multiplier multiplying said base gamma correction value output from said reader and said gamma gain output by said selector to output a real gamma correction value; and a subtractor subtracting said real gamma correction value output by said multiplier from said R, G, B digital signals which are input sequentially, thereby providing gamma correction dot-sequentially for each color.

* * * * *